April 20, 1954   A. VINES ET AL   2,675,608
METHOD OF MAKING SHEET METAL AIRCRAFT STRUCTURES
Filed April 3, 1950   10 Sheets-Sheet 1

ALVIN VINES,
GEOFFREY LEONARD FREEMAN WELHAM,
GEORGE THOMAS MAUGHAN,
Inventors

By Robert B. Pearson
Attorney

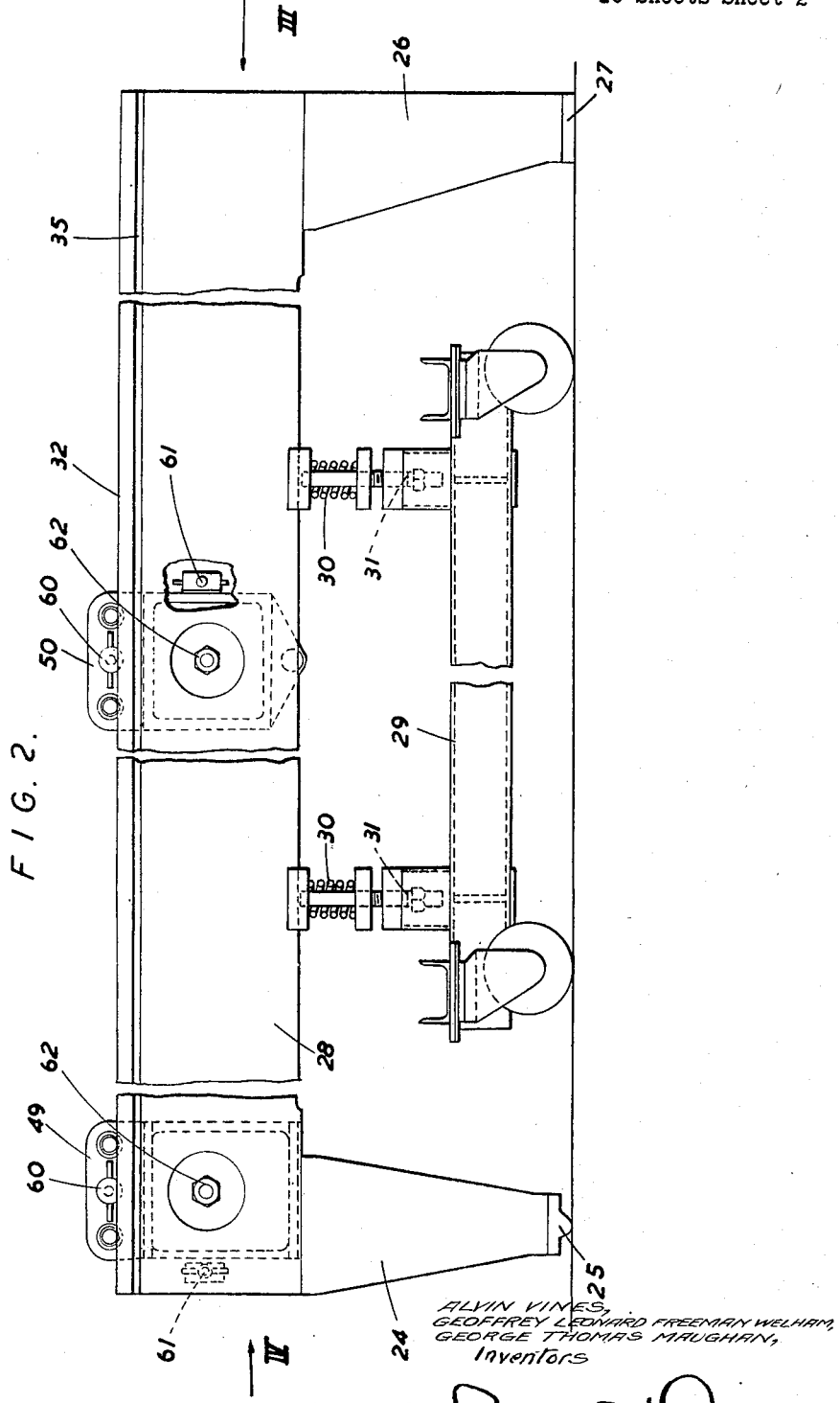

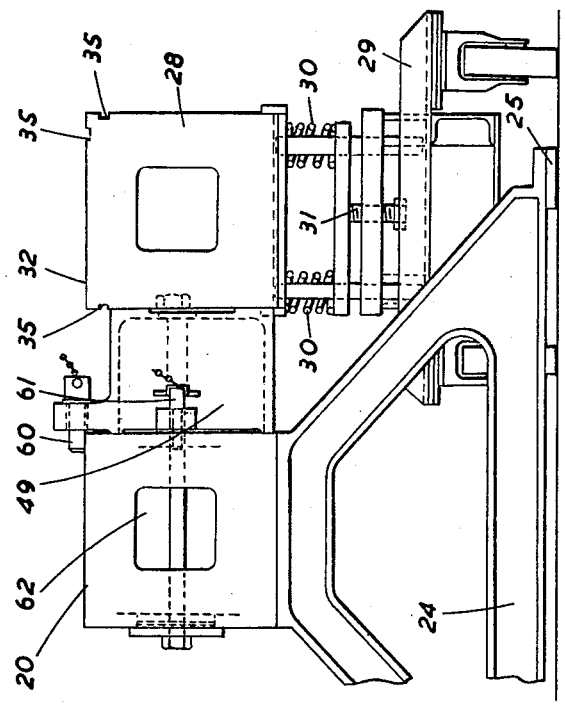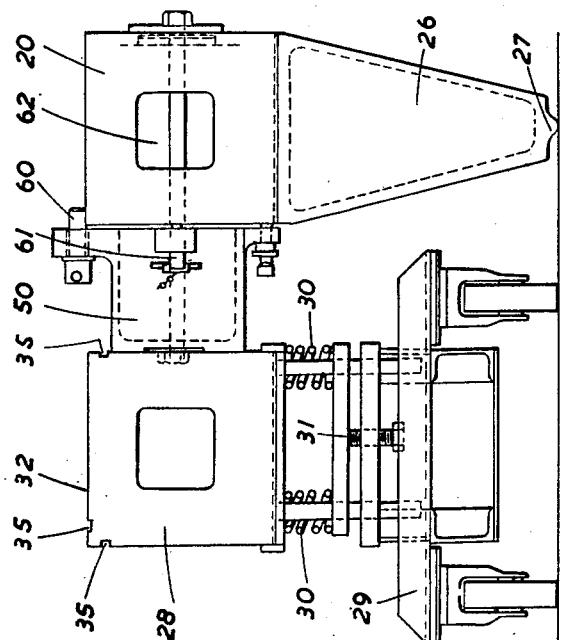

April 20, 1954 A. VINES ET AL 2,675,608
METHOD OF MAKING SHEET METAL AIRCRAFT STRUCTURES
Filed April 3, 1950 10 Sheets-Sheet 5

Inventors
ALVIN VINES,
GEOFFREY LEONARD FREEMAN WELHAM,
GEORGE THOMAS MAUGHAN,
By
Attorney

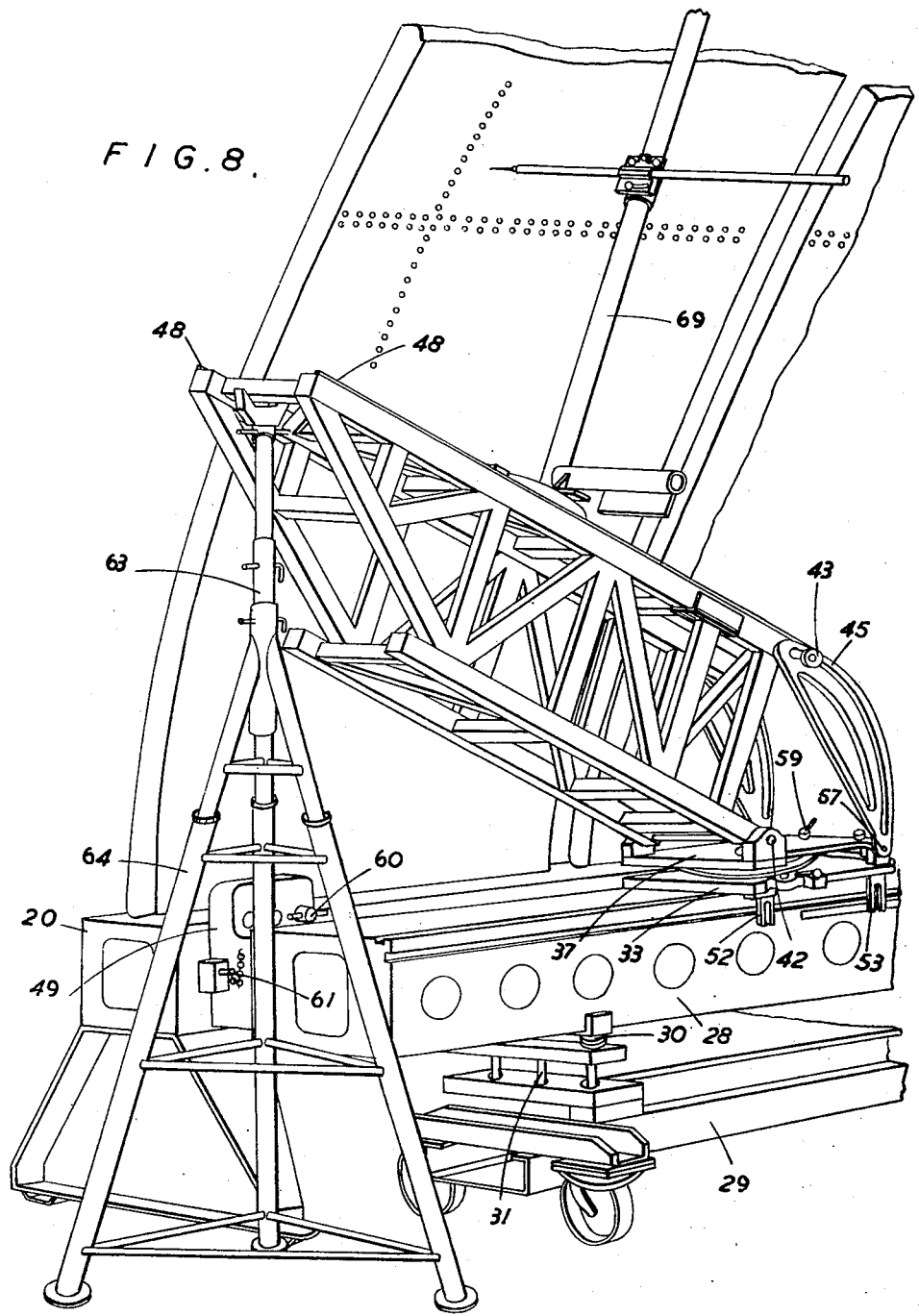

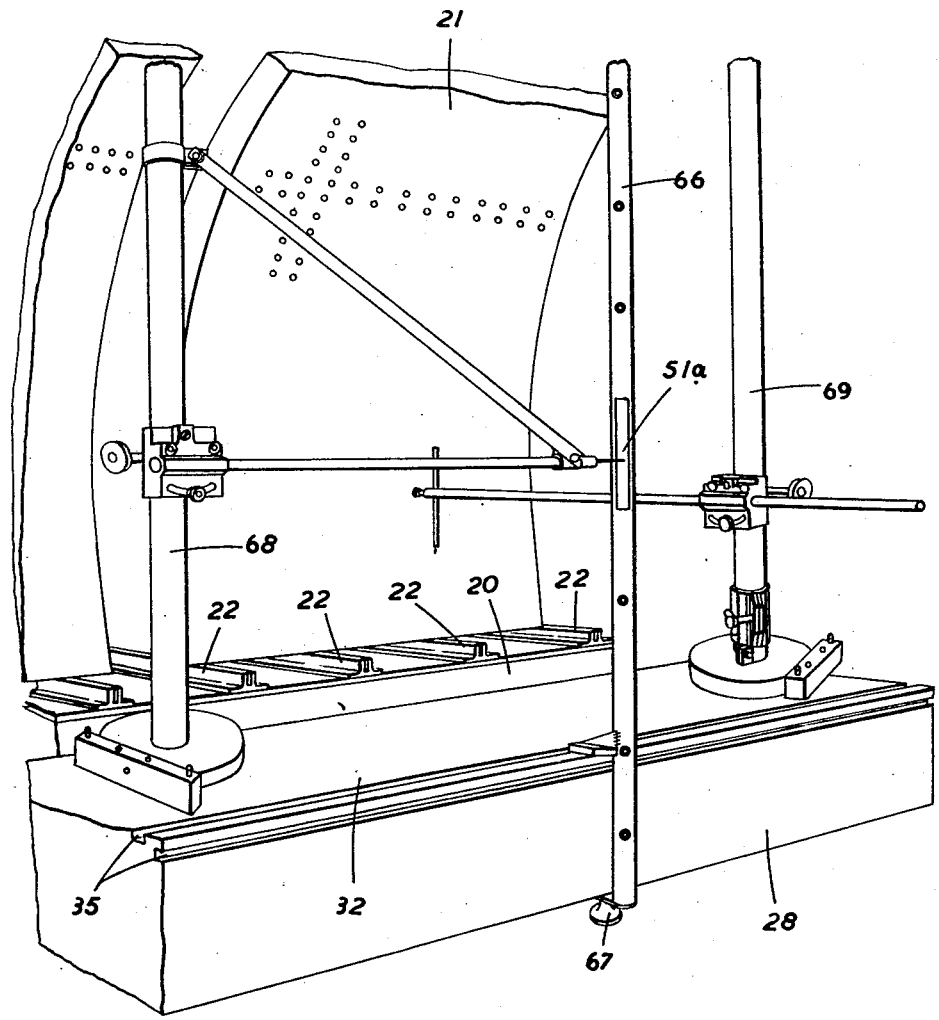

April 20, 1954   A. VINES ET AL   2,675,608
METHOD OF MAKING SHEET METAL AIRCRAFT STRUCTURES
Filed April 3, 1950   10 Sheets-Sheet 9
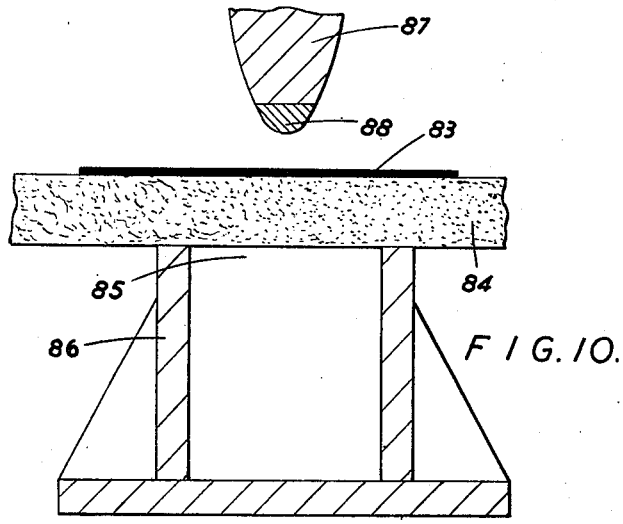
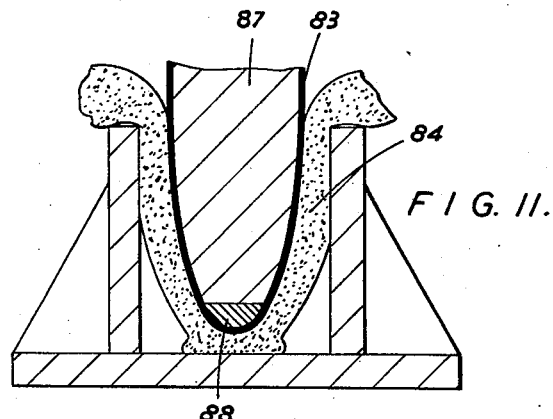
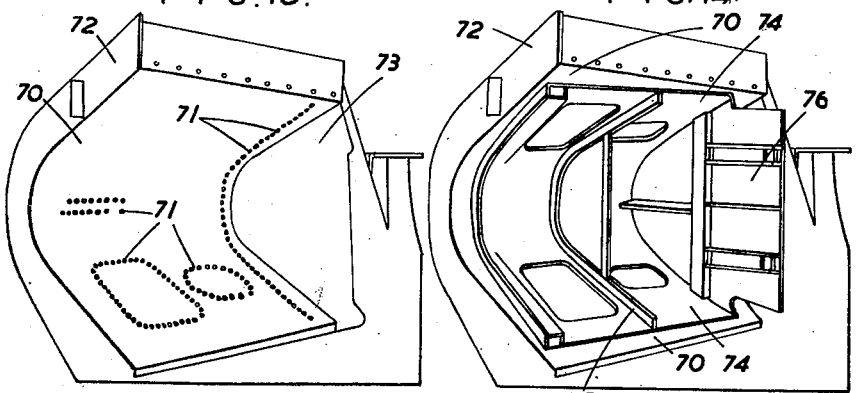
Inventors
ALVIN VINES
GEOFFREY LEONARD FREEMAN WELHAM,
GEORGE THOMAS MAUGHAN,
By
Attorney April 20, 1954 A. VINES ET AL 2,675,608
METHOD OF MAKING SHEET METAL AIRCRAFT STRUCTURES
Filed April 3, 1950 10 Sheets-Sheet 10
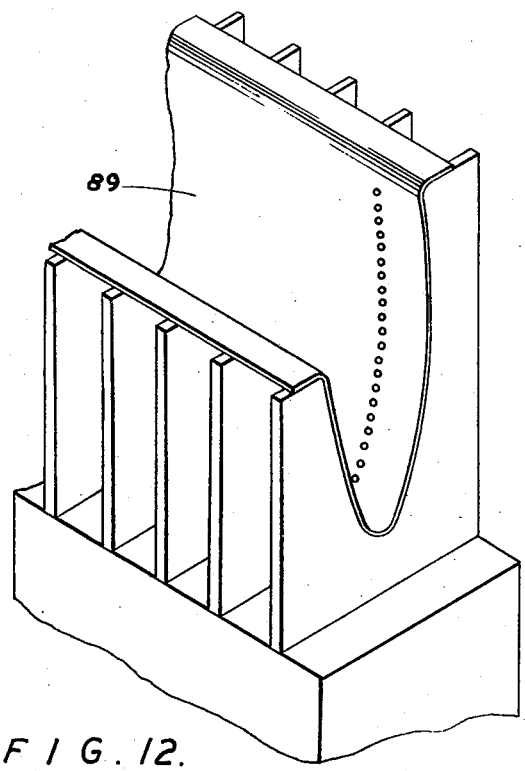
F I G. 12.
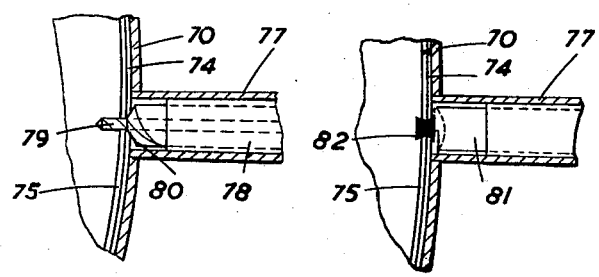
F I G. 15.  F I G. 16.
Inventors
ALVIN VINES,
GEOFFREY LEONARD FREEMAN WELHAM,
GEORGE THOMAS MAUGHAN,
By
Attorney Patented Apr. 20, 1954

2,675,608

UNITED STATES PATENT OFFICE 2,675,608

METHOD OF MAKING SHEET METAL AIRCRAFT STRUCTURES

Alan Vines, Richmond, Geoffrey Leonard Freeman Welham, Mount Pleasant, South Ruislip, and George Thomas Maughan, Hayes, England, assignors to The Fairey Aviation Company Limited, Hayes, England Application April 3, 1950, Serial No. 153,672

Claims priority, application Great Britain December 6, 1949

5 Claims. (Cl. 29—148.2)

This invention relates to the manufacture of complex structures of sheet material, and is of especial, but not exclusive, application in the manufacture of sheet metal wings and fuselages in connection with which it will be described in this specification. It will be appreciated, however, that the invention may be applied in the manufacture of other structures.

In the construction of a sheet metal structure such as an aircraft wing having a metal skin extending over ribs and one or more spars and secured thereto by riveting, the marking out and preparation of the metal skin prior to assembly, known as "lofting," is a matter of considerable difficulty owing to the curvature required of the metal skin when it is assembled on the wing ribs and spars. If the skin is marked out when it is flat, the template or other means employed as a guide must have been calculated to allow for the subsequent curvature of the wing surface, so that the wing skin, when curved, registers correctly with the ribs and spars. This difficulty is increased when diagonal or other than fore-and-aft ribs are present, and when frames or other irregularities are introduced for the accommodation of tanks, landing wheels, and other components. Furthermore, it is increased when large areas of skin are being formed from a single sheet of metal, consequential upon the aim of eliminating needless joints in the skin.

It is an object of the invention to enable a sheet forming the skin of such a structure to be lofted after it has been brought to the desired curvature, simple or compound, or indeed after it has been brought to any shape lying in more than one plane, such shape being that which it will eventually possess after it has been assembled to its supporting members such as ribs and spars. Such lofting will eliminate all inaccuracies, e. g., due to incorrect development, and will enable the skin to be in exact register with its supporting members as regards rivet holes and the like. There is provided for use with the present invention lofting apparatus in which a sheet or panel may be held after it has been brought to its finished curvature or shape, and in which it may be lofted while in that finished shape.

The principle underlying this has been called "envelope tooling" because it is based upon the aerodynamic form or envelope of the aircraft, which is not only the first thing upon which finality is reached in the design of a new type, but which also has an intrinsic functional importance. Essentially, the method of assembling consists of building the component subassemblies from the skin-plating inwards instead of first erecting the structural framework in an assembly fixture, and then applying the skin-plating to it.

According to the present invention a method of making a complex structure of sheet material, such as an aircraft wing, comprises bringing the component parts of the skin of the structure to their finished shape, mounting and retaining each part while in said shape in a lofting apparatus relatively to a datum line, and marking it out relatively to said datum line. Alternatively, instead of the aircraft skin panels being so formed and lofted, there may be formed and lofted in a similar manner a sheet which is subsequently drilled or otherwise adapted to constitute a jig-template for drilling and assembly of the skin and its associated parts therein.

Lofting apparatus for use in the method according to the present invention comprises supporting and clamping means for a shaped sheet, a datum beam adjustable relatively to the sheet when it is supported and clamped, a tower slidable on the datum beam and movable relatively thereto about two axes at right-angles to one another, and scribing means adjustable relatively to the tower.

The datum beam may be mounted on a wheeled carriage and provided with means for vertical adjustment.

The tower may be mounted on a turntable on a slidable carriage on the beam, the turntable being rotatable about an axis normal to that of the beam. The tower may be rotatable through 90° about an axis transverse to that of the beam.

Preferably there are provided vernier adjusting means associated with the means providing angular movement of the tower relatively to the beam.

The invention also includes a method of assembling a complex structure of sheet material, such as an aircraft wing, which comprises forming at least one contour plate, marking it out with a lofting apparatus, converting the marked-out contour plate into a jig-template, e. g., by drilling, locating a skin component and its associated internal members in the jig-template, drilling the skin component through the jig-template, and riveting the skin component and associated internal members together while they are still located against the jig-template.

The contour-plate may be drilled with holes of equal size, and the skin component may be subsequently drilled and countersunk by a drill of any required size located snugly in the bore of a tube the outside diameter of which corresponds with the size of holes in the jig-template.

The invention will be described with reference to the accompanying drawings, in which:

Figure 2 is a front elevation of the datum and supporting beams and carriage of the apparatus, Figure 3 is an end elevation of the beams and carriage, viewed in the direction of the arrow III, Figure 2, Figure 4 is an end elevation of the beams and carriage, viewed in the direction of the arrow IV, Figure 2.

Figure 6:
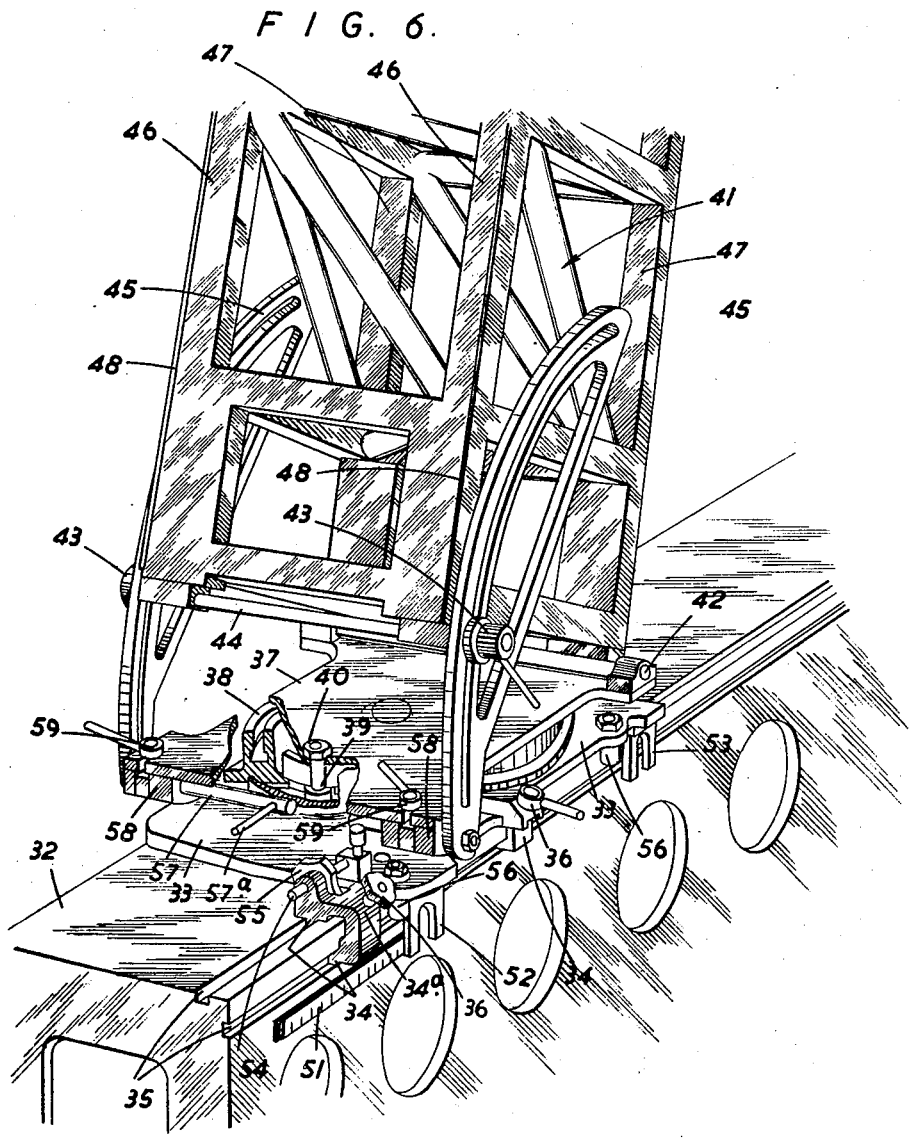
Figure 7:
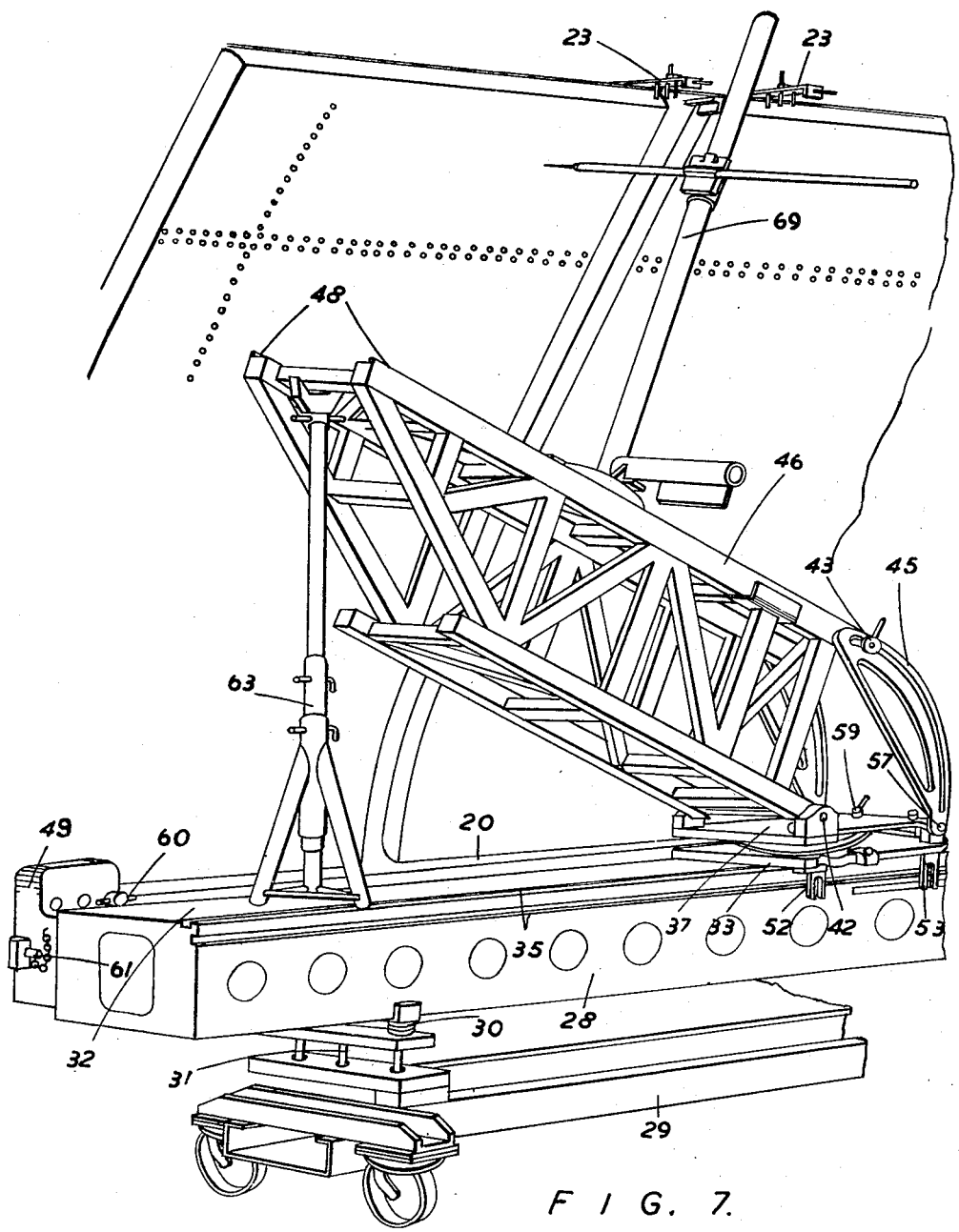

Figure 6 is a fragmentary perspective view, on a still larger scale, of the base of the tower, showing the turntable partly broken away, Figure 7 is a perspective view showing the tower supported in an inclined position, Figure 8 is a perspective view showing the tower in another inclined position, Figure 9 shows marking instruments for use with the apparatus, Figure 10 is a diagrammatic illustration of a press for forming a metal component.

Figure 11 is a corresponding illustration showing the component being formed,

Figure 12 is a fragmentary perspective view of a simple jig-template.

Figure 13 is a perspective view of another jig-template,

Figure 14 is a view of the jig-template with component parts assembled therein,

Figure 15 is a diagrammatic view showing drilling of a metal sheet through a jig-template, and Figure 16 is a similar view showing riveting of the sheet through the jig-template.

Referring to the drawings, one form of lofting apparatus for use in the manufacture of aircraft wings has a horizontal supporting beam 20 on which the skin 21 to be lofted is stood on edge. The beam 20 has vertically extending members 22 each with a curved edge corresponding with the curvature of the skin 21, and at their upper ends the members 22 have clamping means 23, so that the skin 21 may be supported rigidly on one edge in a substantially vertical plane on the supporting beam 20. At one end the supporting beam 20 has a transverse support 24 provided with two feet 25, and at the other end a longitudinal support 26 with a foot 27, so providing three-point support. A datum beam comprises a hollow flat-topped beam 28 mounted on a wheeled carriage 29 on spring mountings 30, with provision 31 for vertical adjustment for levelling purposes. The datum beam 28 is accurately machined, and its flat top 32 is arranged to serve as a surface plate along which may travel a slidable carriage 33 formed with fingers 34 engaging in longitudinal locating grooves 35 in the top and sides of the datum beam 28, and having a clamp 36 engaging the beam 28, whereby the carriage 33 may be maintained in any desired position. The carriage 33 is in two parts, the upper part 37 being mounted on the lower part 38 so as to be rotatable relatively thereto about a vertical axis through 360°, thus constituting a turntable. The lower part 38 is in the form of a horizontal circular gallery into which a clamping screw 39 depends from the upper part 37, and the gallery is provided with an azimuth scale and a vernier micro-setting device. The upper part 37 may therefore be accurately set angularly relatively to the lower part 38 through a range of 360°, and clamped in the selected position by a nut 40 on the screw 39.

The upper part 37 carries a tower 41 pivotally mounted thereon at one side on a horizontal spindle 42 which is transverse relatively to the datum beam 28 when the azimuth setting of the turntable is at its zero point. At the other side the tower has clamps 43 on a rod 44 the ends of which pass through a pair of 90° slotted quadrants 45 carried by the upper part 37 of the turntable. The tower 41 may thus be located and clamped at any angle between the vertical and the horizontal. A micro-setting device is provided for final accurate setting of the angle.

The tower 41 comprises a braced girder structure having two parallel sides of unequal length, the longer side 46 being that which may be clamped to the quadrants 45, and the shorter side 47 being that which is pivotally mounted on the turntable 37. The free ends of these two sides are joined by diagonal struts. The longer side 46 of the tower has accurately machined raised edges 48, and when the tower is set at zero, is at right-angles to the surface 32 of the datum beam 28 both in plan and elevation.

For use in setting the tower longitudinally there is provided a 10" rule 51 fitted with location pins (not shown) and arranged to be movable to other positions along the datum beam 28. This rule may also be used with the vertical rule, as indicated at 51ᵃ in Figure 9. For co-operation with the rule 51 a graticule 52 is mounted in the lower member 33 of the sliding carriage, and is provided with a hair-line (not shown) located so as to be in line with the edges 48 of the tower when the tower is set at 90° to the datum beam 28, with the edges 48 lying in a plane transverse of the datum beam. A second graticule 53 is employed in a similar way in conjunction with the rule 51 when the tower is rotated through 90° about a vertical axis so that the edges 48 lie in a vertical plane parallel with the longitudinal axis of the datum beam 28. Fine setting of the position of the tower in the longitudinal direction is effected, in conjunction with one or other of the graticules, by means of a threaded shaft 54 rotatable by a wheel 55 in a correspondingly threaded aperture in the bracket 34ᵃ which carries the fingers 34. Clamping of the tower after setting in the desired longitudinal position is effected by the clamp 36. This clamping is effected along a 45° axis, so forcing studs 56 hard against the side of the datum beam 28. For fine adjustment of the angular position of the tower about the axis of the transverse rod 42, the quadrants 45 are mounted at their lower ends eccentrically on a transverse bar 57 carried in lugs 58 dependant from the upper part 37 of the turntable. The transverse bar 57 has a tommy bar 57ᵃ whereby it may be rotated and so move the quadrants 45 to give a very small angular movement to the tower about the rod 42. Clamps 59 are provided to clamp the tower after such a setting has been given.

After the skin 21 has been located and clamped on the supporting beam 20, the datum beam 28 is moved into position along-side, and is adjusted to a datum line. In the case of a skin for an aircraft wing, an advantageous datum line is the line indicating the position of the main spar, but any other suitable datum may be adopted. For this purpose the datum beam 28 is provided with a fixed spacing block 49 and a movable spacing block 50. The movable spacing block 50 is arranged to be located for a jig base of 12 ft., 9 ft., or 7 ft., but any other desired base may be allowed for. Each of the spacing blocks has a locating peg 60, which projects through the block and, when the carriage 29 is moved up to the supporting beam 20, rests on the top surface of the supporting beam, so ensuring that the top faces of the supporting beam 20 and datum beam 28 are at the same level. At the same time locating pins 61 are passed through lugs on the spacing blocks 49, 50 and pick up holes in the side of the supporting beams 20. The two beams are then bolted together by bolts 62. The tower may now be unclamped and slid along the datum beam 28 to any desired location, and there reclamped after being accurately set. The edges 48 of the tower, which themselves constitute a surface plate, may now be brought to any desired position, by setting the tower in elevation about its horizontal pivotal spindle 42 and if necessary in azimuth about the turntable spindle, microsetting being possible in each case.

When the tower is to be set at, say, 70° to the vertical, it is convenient, to avoid undue strain on the clamping means, to employ as a support for its free end a vertically adjustable jack 63 which may be stood on the top surface of the datum beam 28 for most positions of the tower. When, however, the free end of the tower extends beyond the datum beam, either sidewise or endwise, the jack 63 may itself be supported on a tripod trestle 64, vertical adjustment to the height of the free end of the tower being provided by the jack 63 itself.

Figure 1:
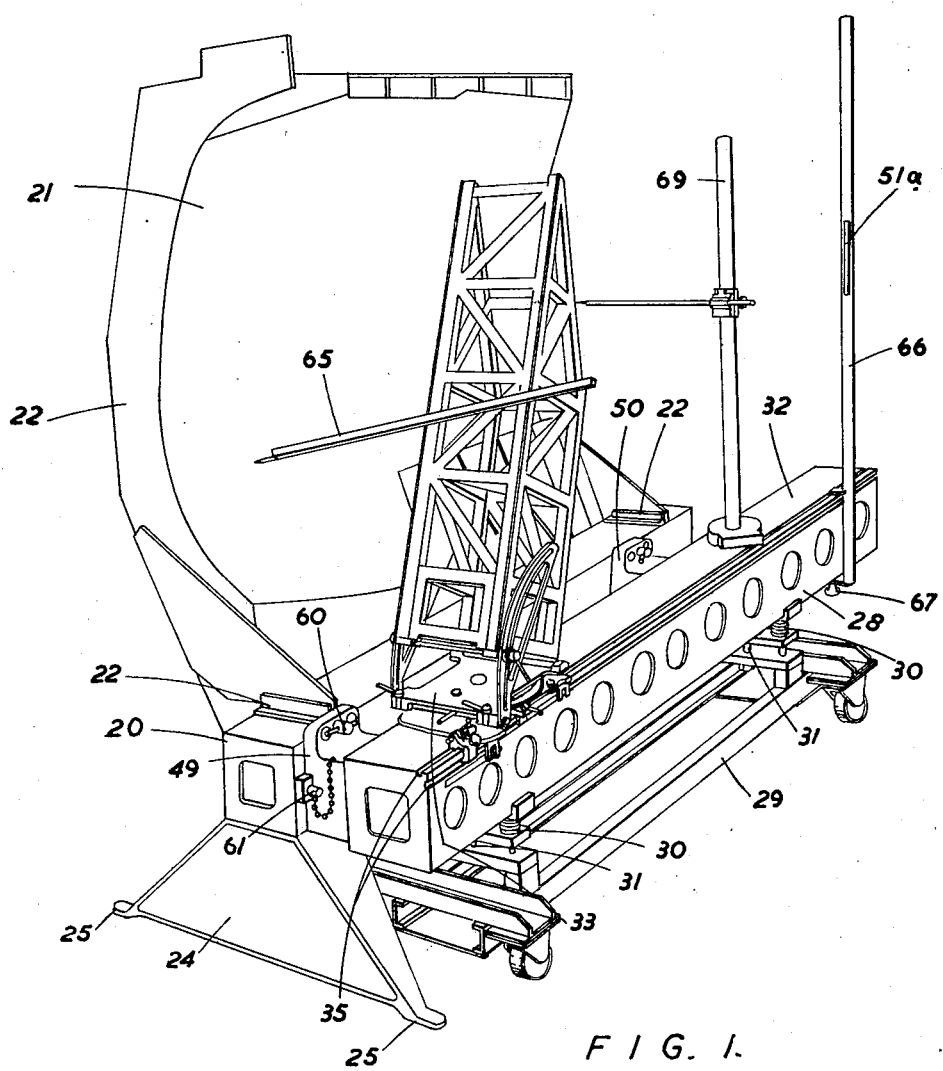
Figure 1 is a perspective view of a lofting apparatus.
Figure 5:
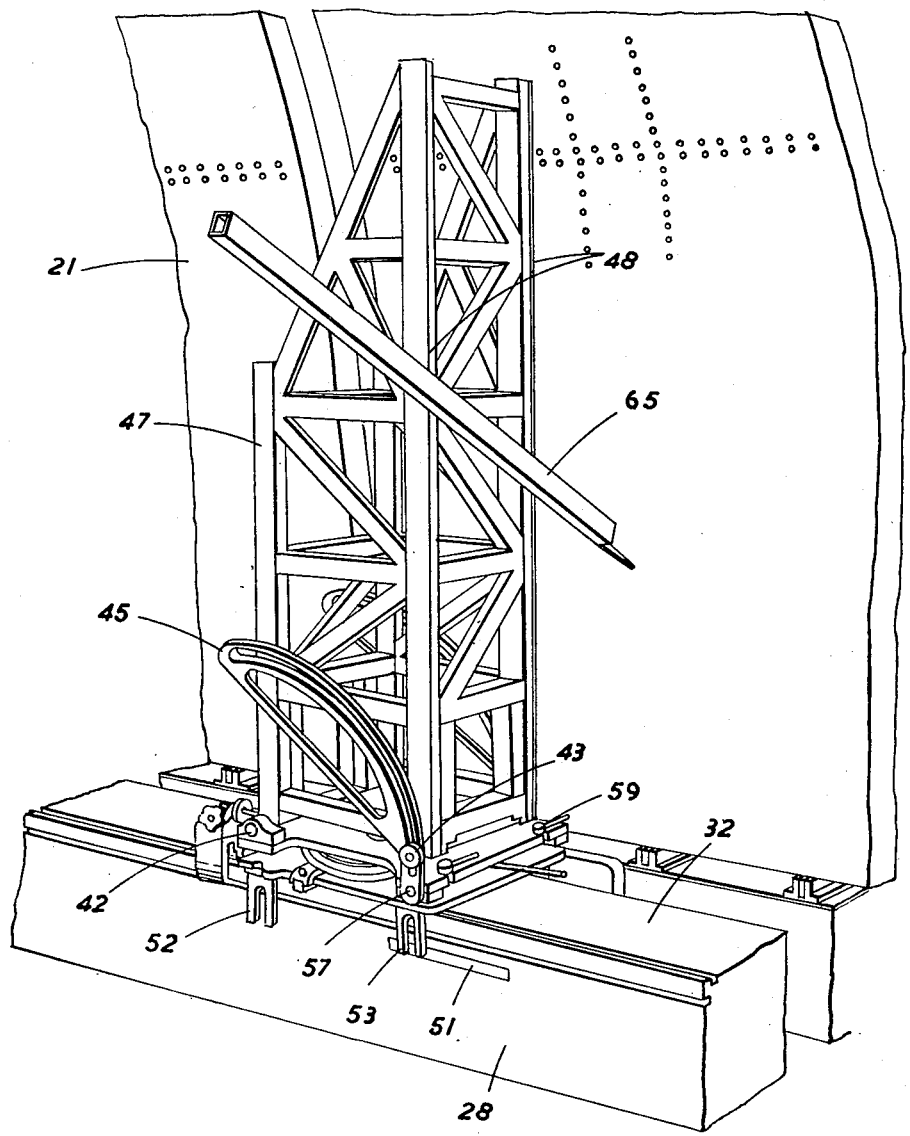
Figure 5 is a fragmentary perspective view, on a larger scale, of the tower.

When the tower has been set as hereinbefore described, marking out may be accomplished by a loose scriber 65 held by hand pressure against the edges 48 of the tower. Lines may thus be scribed on the curved surface of the skin 21 accurately and without difficulty. In addition, there are provided a vertical rule 66 arranged to be clamped normal to the datum beam 28 in any desired location by a clamp 67, and scribing blocks 68, 69 for use in scribing lines in planes parallel with a datum surface. A scribing block for use with the top surface of the datum beam 28 may be rested on the beam, as shown in Figures 1 and 9, while a scribing block for use with the tower may be clamped thereon against the edges 48, as shown in Figures 7 and 8, so that the post of the scribing block is normal to said side.

Instead of a skin for a wing, there may be mounted on the supporting beam 20 a backing plate for a jig. This is first curved to the required curvature of the skin, and is then marked out and drilled in the same way. It is subsequently used as a jig-template for manufacture of the wing, being supported by external ribs and constituting part of what is virtually a female mould. In assembling the wing within such a jig-template, the curved but undrilled skin panels are first located on its inner surface, to which they are attached by clamping pins. The internal members such as spars and ribs are then set up in position and similarly located and clamped. Drilling is then performed, using the backing plate as a template. Preferably drilling and countersinking for rivet heads is performed at a single operation. Exact location of the holes can thus be easily transferred from the curved backing plate to the already curved skin. The method of drilling and riveting will be understood by reference to Figures 13 to 16. In Figure 13 the curved and lofted jig-template 70 is shown drilled, as at 71, and mounted in external ribs 72 against a wall 73. All the holes 71 are the same size, irrespective of the sizes of rivets eventually to be employed. The curved skin 74 is then located in and against the jig-template 70, as shown in Figure 14, and internal ribs 75 and a bulkhead 76 are located and clamped in position. Drilling is then performed as shown in Figure 15. Into the aperture 71 in the jig-template 70 and from the outside of the jig-template there is introduced a sleeve 77 which fits snugly in the aperture. Within the sleeve 77 is a drill-shank 78 formed at its operative end with a drill 79 and a countersink 80. The skin 74 and rib 75 are thus drilled to the requisite dimension simultaneously, and the outer surface of the skin 74 is also countersunk in the same operation. When the drilling tool has been withdrawn a rivet having a preformed head is inserted from the outside of the jig-template 70 and the head is held up on the outside by a tool 81 as shown in Figure 16, while a gun (not shown) is applied to the shank of the rivet from the inside, deforming it as indicated at 82. This method has the advantage that the riveting tends to push the skin 74 into the jig-template 70 and so assists in attaining the correct external form of the finished structure.

The depth of countersink is so arranged that the rivet head protrudes five to ten thousandths of an inch from the outer surface of the skin 74 after riveting. The rivet heads are then faced off, using a small milling cutter, instead of the drilling tool, within the sleeve 77. Depth of cut is controlled to prevent damage to the skin surface.

Components that include detachable parts such as doors can be assembled from routed skin panels that are already finished to size. Production is thereby speeded up, as the necessity of trimming the detachable part to size is obviated.

Shallow curvatures, whether simple or compound, may be imparted to the skin panels thereby forcing them into the jig-template, which is already curved to the required shape. More severe curvatures must, however, be imparted to the skin panels prior to their location in the jig-template, by normal methods such as wheeling.

Referring to Figures 10 to 12, the leading edge section and similarly re-curved sections can be made from a flat metal sheet 83 by laying the sheet on a thick sheet of rubber 84 which bridges the open side 85 of a channel-shaped structure 86. A punch 87 having a body of laminated paper impregnated with a synthetic resin and a nose 88 of laminated fabric impregnated with synthetic resin, and shaped to the conformation of the leading edge section, is then forced against the metal sheet 83 and into the channel-shaped structure 86, so that the rubber 84 presses the metal plate 83 tightly against the punch 87. The shaped metal sheet 83 is then removed from the press and located against the drilled backing plate 89 of a jig, or against an extension thereof, for drilling and riveting to the skin as hereinbefore described.

We claim:

1. In a method for making a structure such as an aircraft wing having a skin of sheet material, comprising the steps of mounting and clamping a curved sheet in a lofting apparatus, selecting a datum line indicating the position of an element of the aircraft wing, marking out said curved sheet relatively to said datum line to indicate points to be drilled, drilling said sheet on the same face as it is marked out to constitute a jig-template, mating at least a portion of said skin with said sheet so that a substantial area of said skin is co-extensive with said sheet, and drilling said skin portion from the remote side of said sheet through the holes drilled in said sheet.

2. In a method for making a structure such as an aircraft wing having a skin of sheet material, comprising the steps of mounting and clamping a curved sheet in a lofting apparatus relatively to a datum line, said datum line indicating the position of an element of the aircraft wing, marking out said sheet relatively to said datum line to indicate positions of rivets, drilling said sheet on the same face as it is marked out to form holes therein larger than the holes to be drilled in the skin through said holes, mating at least a portion of said skin with said sheet so that a substantial area of said skin is co-extensive with said sheet, mounting structural members on the side of said skin remote from said sheet, and drilling said skin and said structural members simultaneously through the holes already drilled in said sheet.

3. A method according to claim 2 wherein said method comprises also the steps of inserting rivets through said skin and structural members from the side of said sheet remote from said skin, and closing said rivets to secure said skin and structural members together.

4. In a method for making a structure such as an aircraft wing having a skin of sheet material, comprising the steps of mounting and clamping a curved sheet in a lofting apparatus, selecting a datum line indicating the position of an element of the aircraft wing, marking out said sheet relatively to said datum line to indicate positions of drill holes for rivets, drilling said sheet on the same face as it is marked out to constitute a jig-template, mating said skin with said sheet so that a substantial area of said skin is co-extensive with said sheet, mounting a drill-guiding sleeve in certain of the holes bored in said sheet, and drilling said skin from the remote side of said sheet through said sleeve to form holes in said skin that are smaller than the holes in said sheet.

5. A method of assembling the components of a complex structure of sheet material such as an aircraft wing comprising the steps of forming at least one contour plate, mounting and clamping said contour plate in a lofting apparatus, marking out said contour plate relatively to a datum line selected to indicate the position of an element of the aircraft wing, drilling said contour plate on the same face as it is marked out to constitute a jig-template, locating a skin component and its associated internal components in the jig-template so that a substantial area of said skin is co-extensive with said jig-template, drilling the skin component and its associated internal components through the jig-template, and riveting the skin component and its associated internal components together while they are still located against the jig-template.

References Cited in the file of this patent

UNITED STATES PATENTS

| Number | Name | Date |
|---|---|---|
| 1,135,089 | Wilks | Apr. 13, 1915 |
| 1,559,807 | Thaden | Nov. 3, 1925 |
| 1,781,723 | Fox | Nov. 18, 1930 |
| 1,877,653 | Fageol | Sept. 13, 1932 |
| 1,922,063 | Vaughn | Aug. 15, 1933 |
| 2,087,626 | Minshall | July 20, 1937 |
| 2,110,752 | Wright | Mar. 8, 1938 |
| 2,317,869 | Walton | Apr. 27, 1943 |
| 2,341,176 | Buehrig | Feb. 8, 1944 |
| 2,342,365 | Pease | Feb. 22, 1944 |
| 2,390,803 | Marschner | Dec. 11, 1945 |
| 2,404,456 | Pierce | July 23, 1946 |
| 2,433,889 | Bryant | Jan. 6, 1948 |
| 2,451,783 | Sweeney | Oct. 19, 1948 |
| 2,474,149 | Hume | June 21, 1949 |
| 2,486,378 | Amiot | Nov. 1, 1949 |
| 2,620,552 | Jenkins | Dec. 9, 1952 |